US011484740B2

(12) United States Patent
Barkay

(10) Patent No.: US 11,484,740 B2
(45) Date of Patent: Nov. 1, 2022

(54) METHOD AND SYSTEM FOR IDENTIFYING FLOW IN HYDRANT OUTLET

(71) Applicant: Hydrantech Ltd., Ramat YiShai (IL)

(72) Inventor: Dov Barkay, Ramat YiShai (IL)

(73) Assignee: Hydrantech Ltd., Ramat Yishai (IL)

( * ) Notice: Subject to any disclaimer, the term of this patent is extended or adjusted under 35 U.S.C. 154(b) by 396 days.

(21) Appl. No.: 16/487,812

(22) PCT Filed: Feb. 21, 2018

(86) PCT No.: PCT/IL2018/050197
§ 371 (c)(1),
(2) Date: Aug. 21, 2019

(87) PCT Pub. No.: WO2018/154571
PCT Pub. Date: Aug. 30, 2018

(65) Prior Publication Data
US 2020/0054911 A1 Feb. 20, 2020

Related U.S. Application Data

(60) Provisional application No. 62/461,325, filed on Feb. 21, 2017.

(51) Int. Cl.
*A62C 37/50* (2006.01)
*G01M 3/28* (2006.01)
(Continued)

(52) U.S. Cl.
CPC .............. *A62C 37/50* (2013.01); *A62C 35/20* (2013.01); *G01M 3/28* (2013.01); *G08B 21/18* (2013.01)

(58) Field of Classification Search
CPC .......... A62C 37/50; A62C 35/20; G01M 3/28; Y10T 137/5327
See application file for complete search history.

(56) References Cited

U.S. PATENT DOCUMENTS 8,657,021 B1 2/2014 Preta et al.
2011/0308638 A1 12/2011 Hyland et al.
(Continued)

FOREIGN PATENT DOCUMENTS

CA 2766850 A1 12/2011
CN 1828233 A 9/2006
(Continued)

*Primary Examiner* — Kevin R Barss
(74) *Attorney, Agent, or Firm* — Browdy and Neimark, P.L.L.C.

(57) ABSTRACT

The present invention provides an apparatus for identifying irregular flow, at the entrance of hydrant outlet. The apparatus comprised of: a ring shaped housing having interface for connecting on one end the hydrant pipe end and on the other end to the hydrant outlet part, at least two flow detection sensors positioned in said ring shaped housing, located at predefined distance for each other, a processor for analyzing in real-time sensors measurements, by checking time differences between the detectors received signals and differences between measurements level of the detectors, wherein based on said analysis is determined if the liquid flow is in outward direction form the hydrant or in ward direction from into the hydrant and for calculating flow quantity and communication module for sending alerts based on the analyzed data.

18 Claims, 17 Drawing Sheets

(51) Int. Cl.
  *A62C 35/20*  (2006.01)
  *G08B 21/18*  (2006.01)

(56) References Cited

U.S. PATENT DOCUMENTS

2016/0093193 A1 3/2016 Silvers et al.
2016/0252422 A1* 9/2016 Howitt ................ G01M 3/2807
                73/40.5 A

FOREIGN PATENT DOCUMENTS

CN  103469851 A  12/2013
CN  103874873 A   6/2014

\* cited by examiner

METHOD AND SYSTEM FOR IDENTIFYING FLOW IN HYDRANT OUTLET

TECHNICAL FIELD

The present invention relates to the field of identification of flow of liquids in pipes construction and more specifically to identification of flow direction in hydrant outlet.

SUMMARY OF INVENTION

The present invention provides an apparatus for identifying irregular flow, at the entrance of hydrant outlet. The apparatus comprised of: a ring shaped housing having interface for connecting on one end the hydrant pipe end and on the other end to the hydrant outlet part, at least two flow detection sensors positioned in said ring shaped housing, located at predefined distance for each other, a processor for analyzing in real-time sensors measurements, by checking time differences between the detectors received signals and differences between measurements level of the detectors, wherein based on said analysis is determined if the liquid flow is in outward direction form the hydrant or in ward direction from into the hydrant and for calculating flow quantity and communication module for sending alerts based on the analyzed data.

The present invention disclose an apparatus for identifying irregular flow, at the entrance of hydrant outlet, said apparatus comprised of:
- a ring shaped housing having interface for connecting on one end the hydrant pipe end and on the other end to the hydrant outlet part;
- at least two flow detection sensors positioned in said ring shaped housing, wherein each sensor has different level of sensitivity;
- a processor for analyzing in real-time sensors measurements, by checking differences between measurements level of the detectors, wherein based on said analysis is determined if the liquid flow is in outward direction form the hydrant or in ward direction from into the hydrant and for calculating flow quantity;
- communication module for sending alerts based on the analyzed data.

According to some embodiments of the present invention the apparatus further comprising ab acoustic sensor, for activating the flow sensors upon sound measurement above predefined threshold.

According to some embodiments of the present invention the apparatus further comprising a one direction valve installed at the hydrant, wherein the is one direction valve comprised of two flip parts which are designed to rotate in only one direction, such as when a liquid flow outward from the hydrant they rotate outward, and when the liquid flow inside the hydrant the flip parts remains in closed position preventing the flow.

According to some embodiments of the present invention the apparatus further comprising heat exchange unit installed in the hydrant pipe, wherein the heat exchange unit is comprised of spiral-spring shape enclosing the pipe of the hydrant, upon which is enclosed a double jacket cover.

According to some embodiments of the present invention the apparatus further comprising a seismic sensors, wherein the seismic measurements above pre-defined threshold are transmitted to the central system, enabling to analyze, the results from the plurality of hydrant devices for identifying earth quake events.

According to some embodiments of the present invention the apparatus further comprising a temperature sensor.

According to some embodiments of the present invention the apparatus further comprising a moisture sensor.

The present invention disclose a monitoring system comprised of:
- plurality of hydrants, wherein each hydrant is comprise the identification apparatus as described above;
- a central system comprised of:
  - communication module for receiving sensors measurements from said plurality of hydrants;
  - processing unit for analyzing said measurements for identifying alert status in case the sensor measurements analysis results indicate of irregular behavior.

According to some embodiments of the present invention the apparatus the processing unit analyses flow detecting measurements of adjacent hydrant to identify leaks at pipes located in-between said adjacent hydrant.

According to some embodiments of the present invention the apparatus the leaks analyses include the steps of:
- changing sensor sensitivity at night to high sensitivity to detect leaks at near by pipe connected to the hydrant;
- analyzing accumulated sensor data during predefined time period to detect leak at the pipe connected to relevant hydrant;
- in case of detecting leak checking, water leak at the pipe of adjacent hydrants
- in case of two adjacent hydrant reporting similar leak identification, determine leak in pipe between said hydrant;

According to some embodiments of the present invention the apparatus the processing unit analyses measurements of seismic sensors plurality of hydrants to identify earth quake event The present invention provides a method for identifying irregular flow, at the entrance of hydrant outlet using at least two flow detection sensors positioned at the entrance of hydrant, a processor and remote server, said method implemented by one or more processors operatively coupled to a non-transitory computer readable storage device, on which are stored modules of instruction code that when executed cause the one or more processors to perform:
- detecting flow measurements from each sensor, wherein each sensor has different level of sensitivity,
- analyzing in real-time sensors measurements by the processor, by checking differences between measurements level of the detectors, wherein based on said analysis is determined if the liquid flow is in outward direction form the hydrant or in ward direction from into the hydrant and for calculating flow quantity;
- sending alerts based on the analyzed data to the remote server.

According to some embodiments of the present invention the system further comprising the steps of: analyzing seismic measurements above pre-defined threshold from seismic sensors located at the entrance of hydrant, transmitting said measurements enabling to analyze, the results from the plurality of hydrant devices for identifying earth quake events.

According to some embodiments of the present invention the method further comprising the steps of: detecting temperature using a temperature sensor and transmitting to remote server According to some embodiments of the present invention the method comprising further comprising the steps of: detecting moisture using a moisture sensor and transmitting to remote server.

According to some embodiments of the present invention the apparatus comprising the steps of: detecting wake up signal using an acoustics sensor and responsively activating the flow sensors.

According to some embodiments of the present invention the method further comprising the step of transmitting instruction to the apparatus at the hydrant for activating different modules, including at least one of: closing of hydrant, activating different sensors, activating light, sound triggers or heating exchange unit.

According to some embodiments of the present invention the system further comprising at least one controllable valve for closing the hydrant wherein the server transmitting instruction to the apparatus at the hydrant for activating different modules, including at least one of: closing of the hydrant, activating different sensors, activating light, sound triggers or heating exchange unit.

According to some embodiments of the present invention the apparatus further comprising sensors for measuring air pollution.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
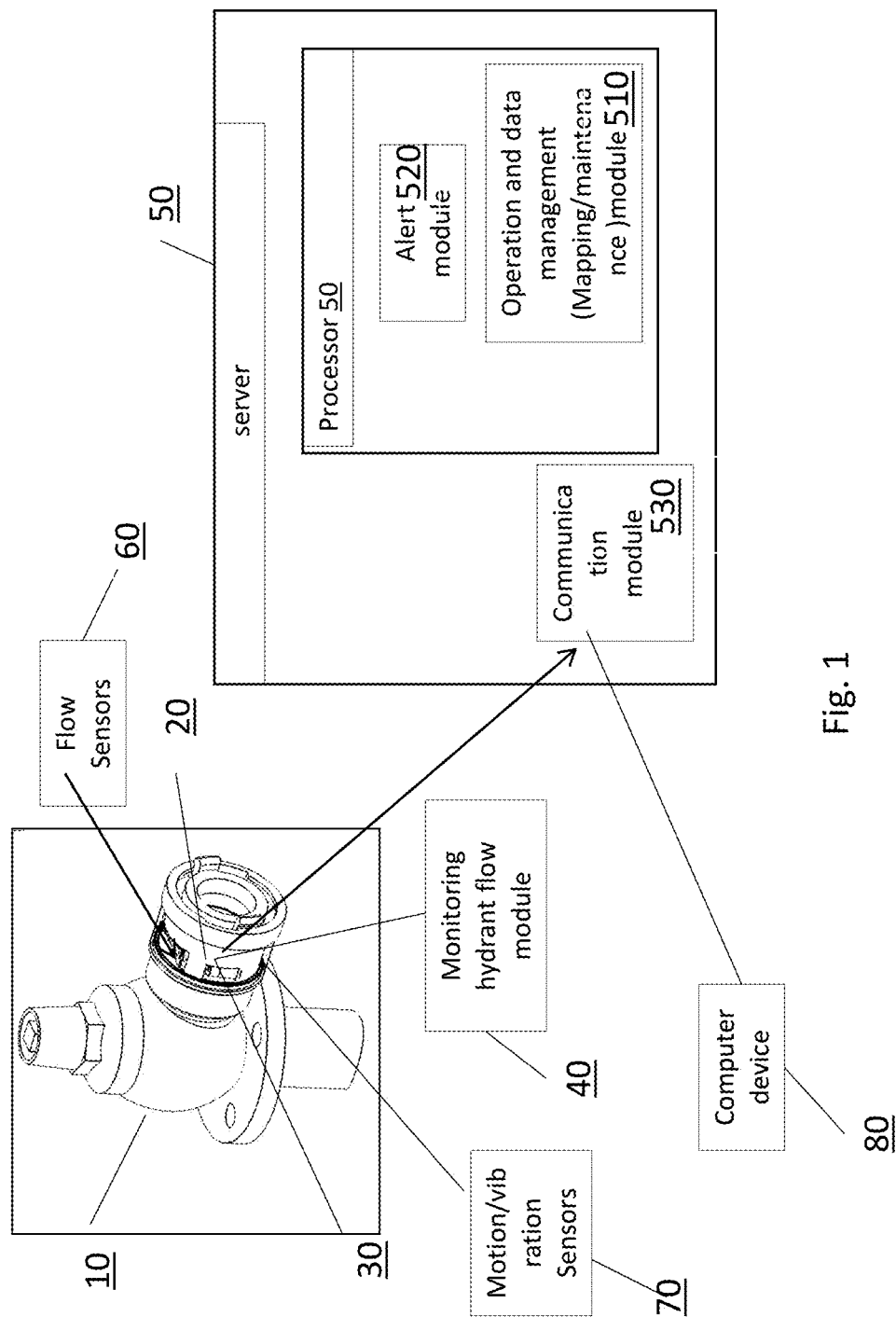
FIG. 1 is a block diagram illustrating the components of the flow identification system according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a block diagram illustrating the components of the flow identification system according to some embodiments of the invention. The present invention provides a flow identification apparatus 12 installed on an outlet of a hydrant 10. The identification apparatus 10 is in communication with an alert module 520 through communication module 530 at server 50 through a wireless communication network. The identification apparatus 10 is comprised of processor 30 which include Monitoring hydrant flow module and two sensors (e.g. piezo sensors) 40.

According to some embodiments the apparatus includes vibration sensors 70. The server 50 comprise communication module 530 and processor 50 which include an alert module and an operation and data management (Mapping/maintenance) module 520 which can be updated by computerized device 80, such as PC, laptop, tablet or smart phone. The Operation and data management (mapping) module 510 can receive updated information of hydrant network and their geographical location. Optionally, the management module 520, can transmit instruction to identification apparatus at the hydrant for activating different modules, such as closing of hydrant, activating different sensors, activating light, or sound triggers or heating exchange (see further explanation below). Based on this information the management module create a map (see FIG. 8), including online, real-time information of the status of all existing hydrants by their geographical location. The status of each hydrant can be updated automatically by the processor, which analyzes information coming from the different type sensors installed on the identification device, including flow sensors, motion/vibration sensors. The analyze may indicate if the hydrant is working properly, battery status, any hazard event indicating the identification device may be damaged. According to some embodiments of the present invention the identification apparatus may include: a controllable valve, light and audio module which can be remotely autoactivated by instructions from management module based on the analyzing of sensor data The management module may enable to insert data manually of hydrants which are not equipped with the flow identification apparatus as suggested by the present invention, hence enabling to provide full inventory map of all installed hydrants.

The inventory information of all hydrants with their geographical location can be used to in real-time to report the fire or police services of hydrants near-by a reported event and send data to the traffic lights enabling fast arrival of the emergency service vehicle.

The usage information of hydrants can be accumulated and statistically analyzed for optimizing the planning of geo-location of hydrants in different type of areas.

According to some embodiments of the present invention, the flow identification apparatus includes temperature sensor for measuring the temperature inside and/or outside the hydrant, reporting alert incase the temperature in beneath or above pre-defined temperature.

According to some embodiments of the present invention, the flow identification apparatus comprises temperature sensor and internal heating mechanism. In case the temperature is beneath predefined values which make the hydrant non usable(such as freezing state), the heating mechanism can be activated(manually by receiving remote activation command from the management module or automatically). The heating mechanism may include a solid fuel cell, which is activated in case the temperature in beneath the predefined values.

According to some embodiments of the present invention, the flow identification apparatus comprises flickering led to ease the hydrant identification in the dark.

According to some embodiments of the present invention, the flow identification apparatus comprises a proximity sensor for identify, blockage of the hydrant opening. In case of blockage for predefined time period an alert is transmitted to the management system.

According to some embodiments of the present invention, the flow identification apparatus comprises, a camera, which is activated in case of an alert, when unauthorized water flow is detected.

According to some embodiments of the present invention, the flow identification apparatus comprises smoke detector for alerting of nearby fire events.

According to some embodiments of the present invention, the flow identification apparatus comprises SIM card to enable communication with cellular network.

According to some embodiments of the present invention, the flow identification apparatus comprises various sensors indicating of weather condition, such as temperature, humidity or rain detection/measurement unit.

According to some embodiments of the present invention, the flow identification apparatus comprises sensors for measuring air pollution such as: CO, dust, humidity, Radon gas, etc. The measurement of pollution may indicate of fire.

According to some embodiments of the present invention, the flow identification apparatus comprises sound detector for identifying noises exceeding predefined value According to some embodiments of the present invention, the flow identification apparatus comprises sensors for measuring radiation such as electromagnetic or RF (e.g. WIFI)

According to some embodiments of the present invention it is suggested to utilize the infrastructure of the hydrants in the city, by integrating the identification apparatus with SIM card at each hydrant, as suggested by the present invention integrated with SIM card and different type of sensors (as described above) can be used to create sensors communication network. Such sensors communication network can be used to collect various types of data, providing detailed data coverage of a city area, such pollution, weather conditions or sound. This sensors network can be integrated with smart city system, providing the user of the smart city with different type of data.

According to some embodiments of the present invention, the flow identification apparatus comprises hotspot communication module enabling to create WIFI network.

Figure 2:
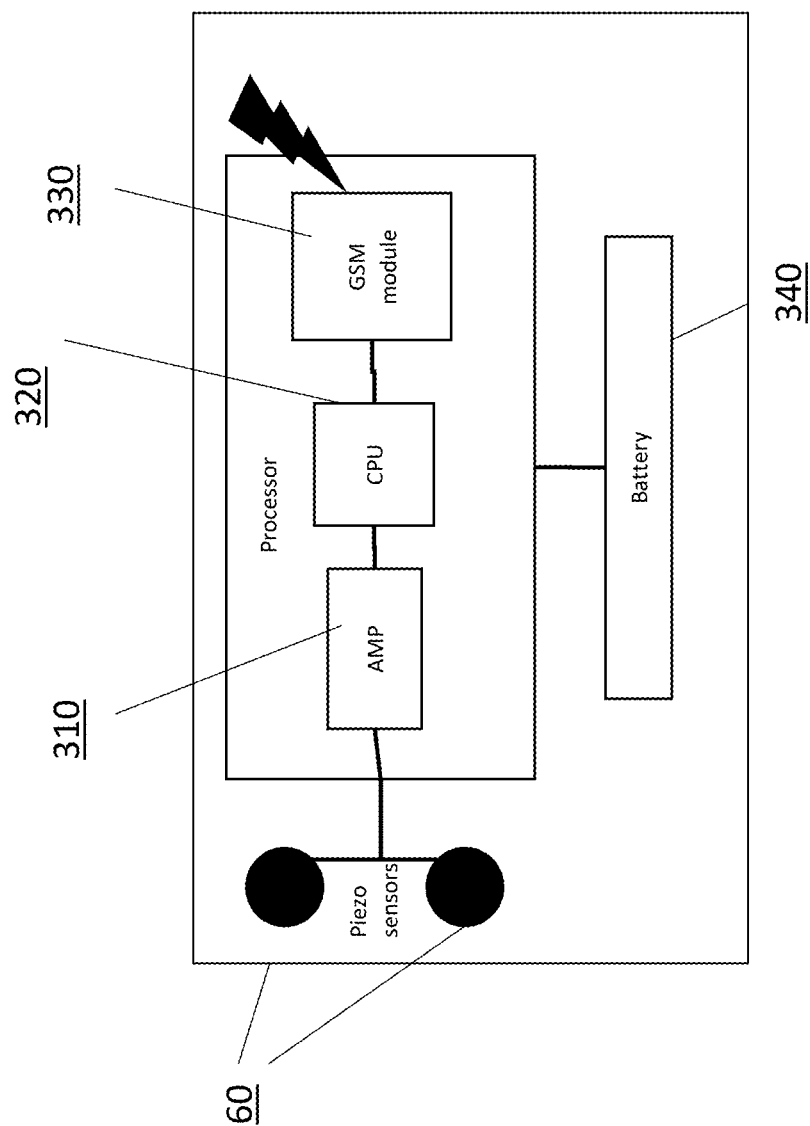
FIG. 2 is a block diagram illustrating the processor device according to some embodiments of the invention.

FIG. 2 is a block diagram illustrating the processor device according to some embodiments of the invention. The processor device is comprised of an amplifier 310, CPU 320 unit which includes Monitoring hydrant flow module for analyzing sensors measurements to identify flow direction and flow quantity and GSM module for communicating a network server. The process device is empower by battery 340 and receives data from sensor 60. (optionally may be included solar cell for power.

Figure 3A:
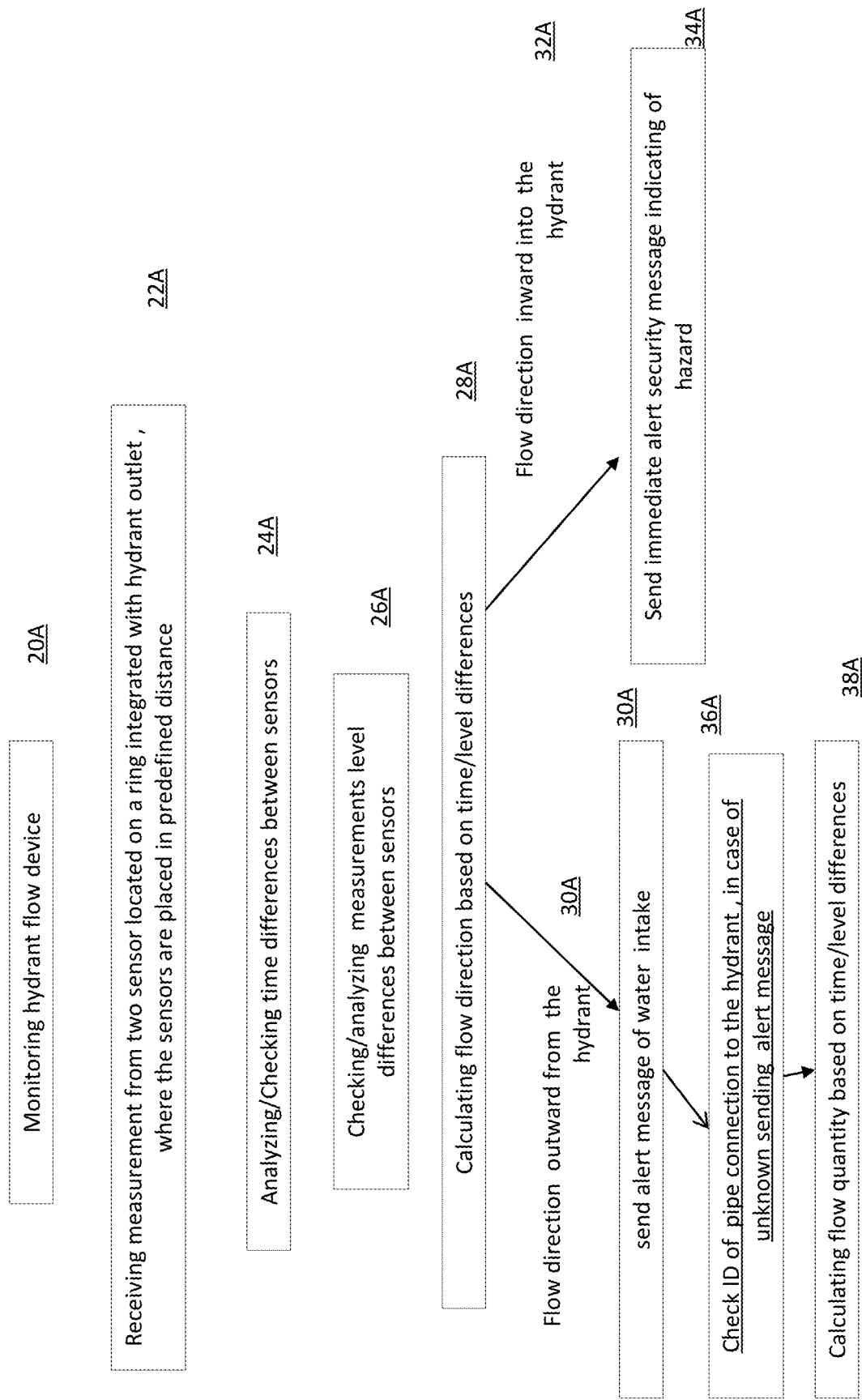
FIG. 3A is an illustration of the flow identification process according to some embodiments of the invention

FIG. 3A is an illustration of the flow identification process according to some embodiments of the invention. This module includes the fooling steps:
Receiving measurement from two sensor located on a ring, integrated with the hydrant outlet, where the sensors are placed in predefined distance, (step 22A)
Analyzing/Checking time differences of incoming signals between sensors, (step 24A)
Checking/analyzing measurements level differences between sensors,
Calculating flow direction based on time/level differences (step 26A)
In case Flow direction inward into the hydrant (32): Send immediate alert security message indicating of hazard, (step 34A)
in case Flow direction outward from the hydrant send alert message of water intake (step 30A), Check ID of pipe connection to the hydrant or check with the authorities services such as firemen department (step 36A) (optionally connected to the fireman vehicle to check in real-time if the specific hydrant was used to by an authorized entity), in case of unknown intake send alert message and Calculate flow quantity based on time/level differences (38A).

Figure 3B:
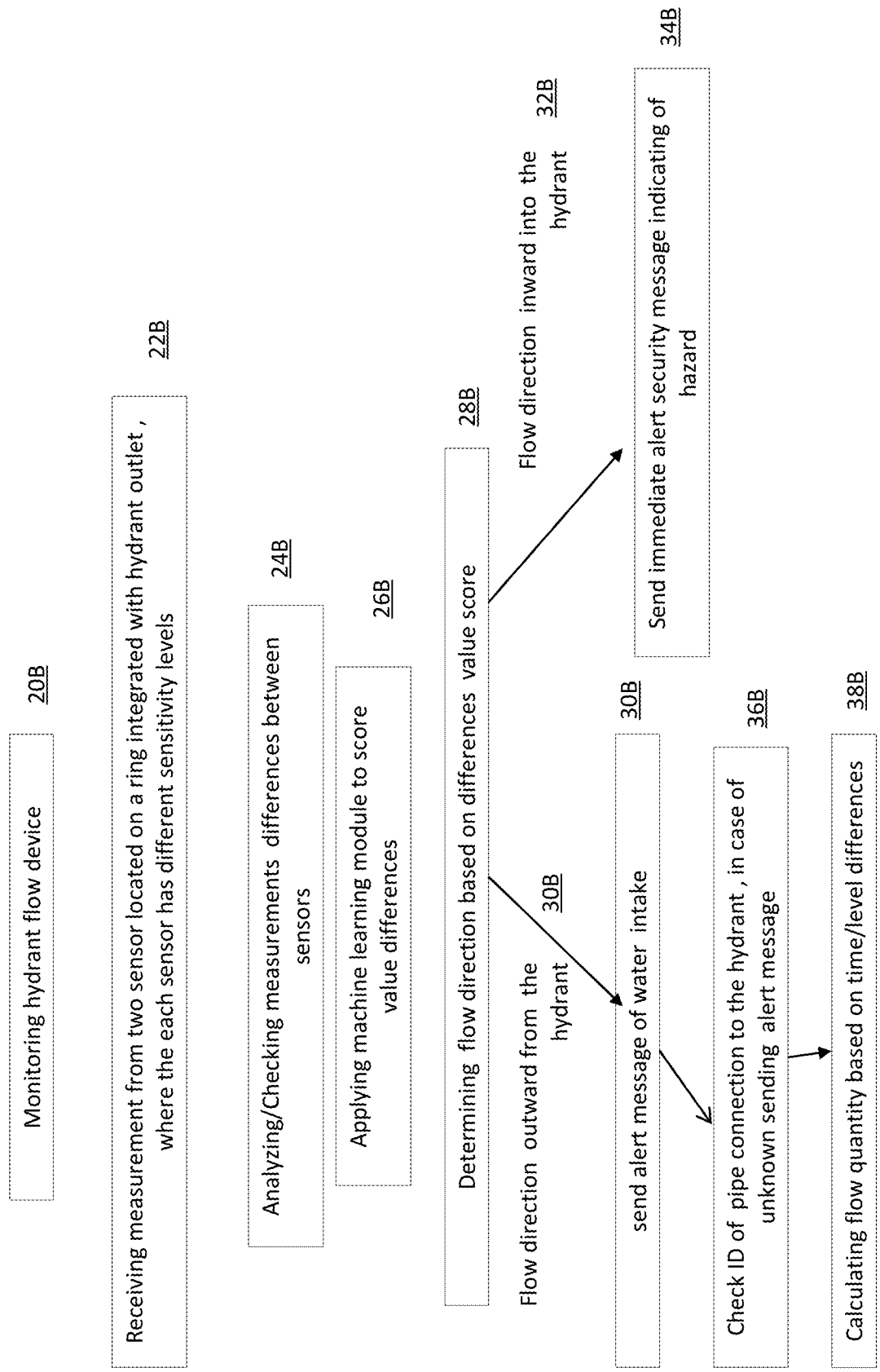
FIG. 3B is an illustration the flow identification process according to some embodiments of the invention.

FIG. 3B is an illustration the flow identification process according to some embodiments of the invention. This module includes at least one of the following steps:
Receiving measurement from two sensor located on a ring, integrated with the hydrant outlet, where the each sensor has different sensitivity levels (step 22B)
Analyzing/Checking time differences of incoming signals between sensors, (step 24B)
Checking/analyzing measurements level differences between sensors,
Applying learning module to score value differences (step 26B)
In case Flow direction inward into the hydrant(32B): Send immediate alert security message indicating of hazard, (step 34B)
in case Flow direction outward from the hydrant send alert message of water intake (step 30B), Check ID of pipe connection to the hydrant or check with the authorities services such as firemen department (step 36B) (optionally connected to the fireman vehicle to check in real-time if the specific hydrant was used to by an authorized entity), in case of unknown intake send alert message and Calculate flow quantity based on time/level differences (38B).

Figure 4:
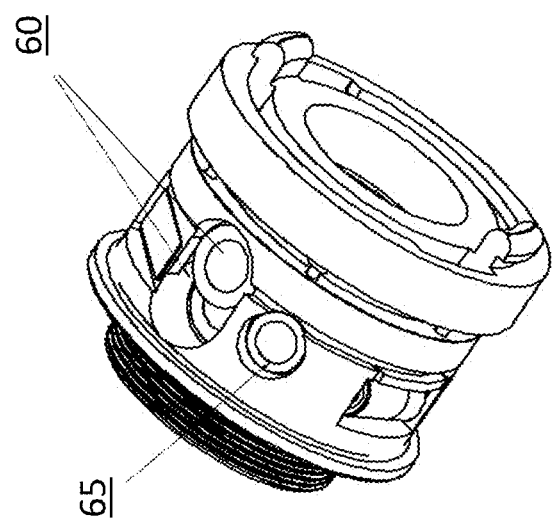
FIG. 4 is a perspective view of the identification device according to some embodiments of the invention.

FIG. 4 is a perspective view of the identification device according to some embodiments of the invention; according to this embodiments the apparatus further comprising an acoustic sensor 65 functioning as a wakeup sensor, for activating the flow sensors upon sound measurement above predefined threshold. According to this embodiments the apparatus the flow sensors 60 having different sensitivity threshold value for measuring the liquid flow.

Figure 5:
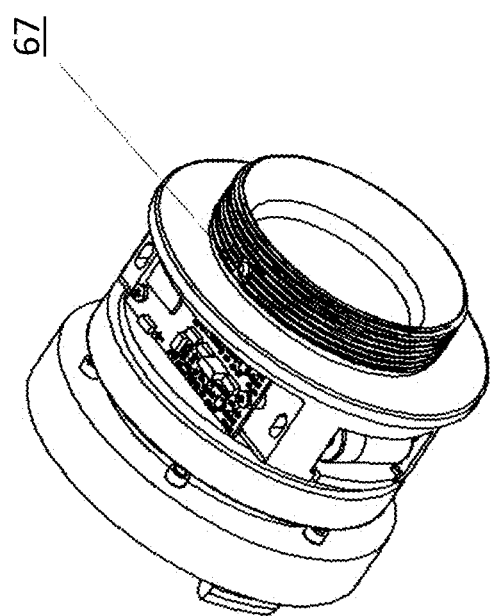
FIG. 5 is a perspective view of the identification device according to some embodiments of the invention.

FIG. 5 is a perspective view of the identification device according to some embodiments of the invention. At this view of the apparatus can be seen the screw thread 67 at the edge for fitting the hydrant inner screw thread.

Figure 6:
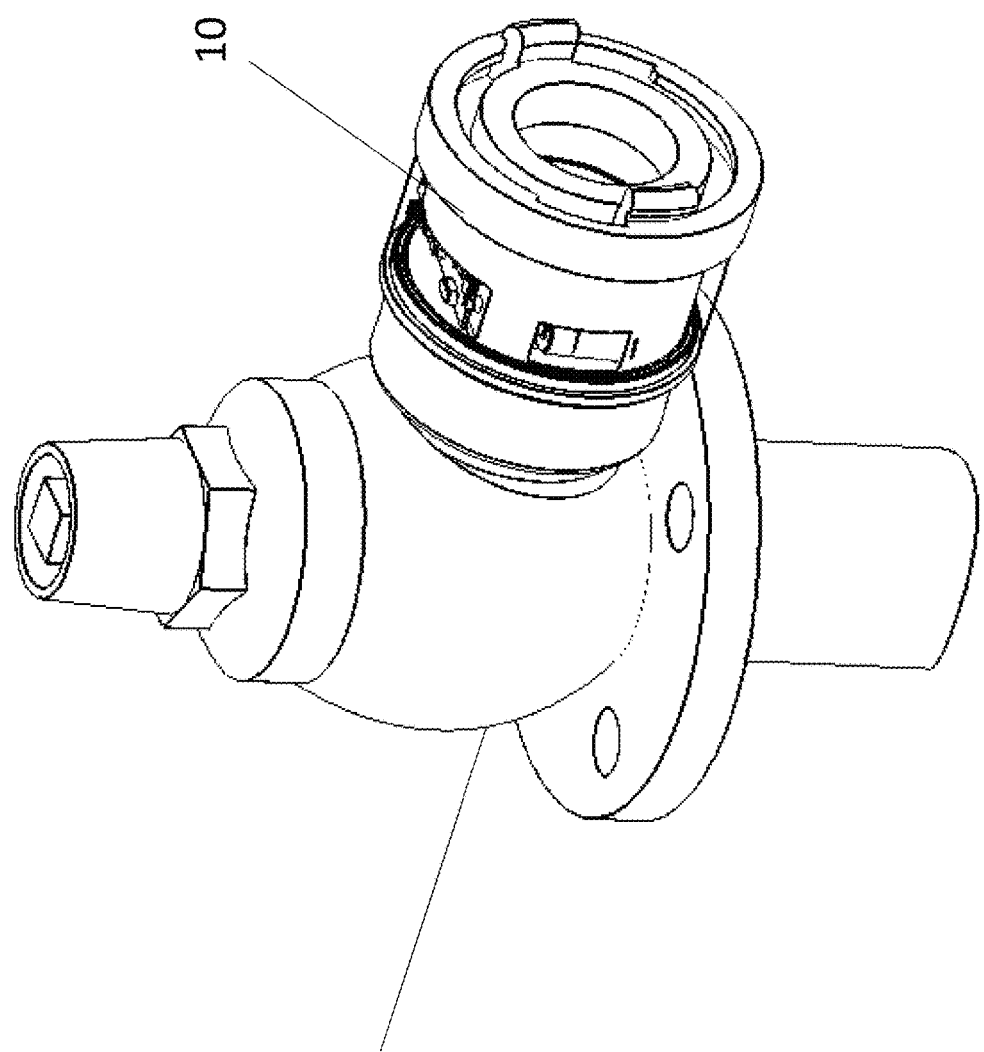
FIG. 6 is a perspective view of the identification device installed on a hydrant outlet according to some embodiments of the invention.

FIG. 6 is a perspective view of the identification device installed on a hydrant outlet according to some embodiments of the invention. As can be seen in this view identification device 10 is implemented as ring, which is shaped and designed to be installed on the hydrant outlet 20. The identification device 10 comprise at least two sensors, positioned in pre-defined distance, such that the timing difference of the measurements of the two sensors can indicate on the direction of the flow: inward into the hydrant or outward from the hydrant.

Figure 7:
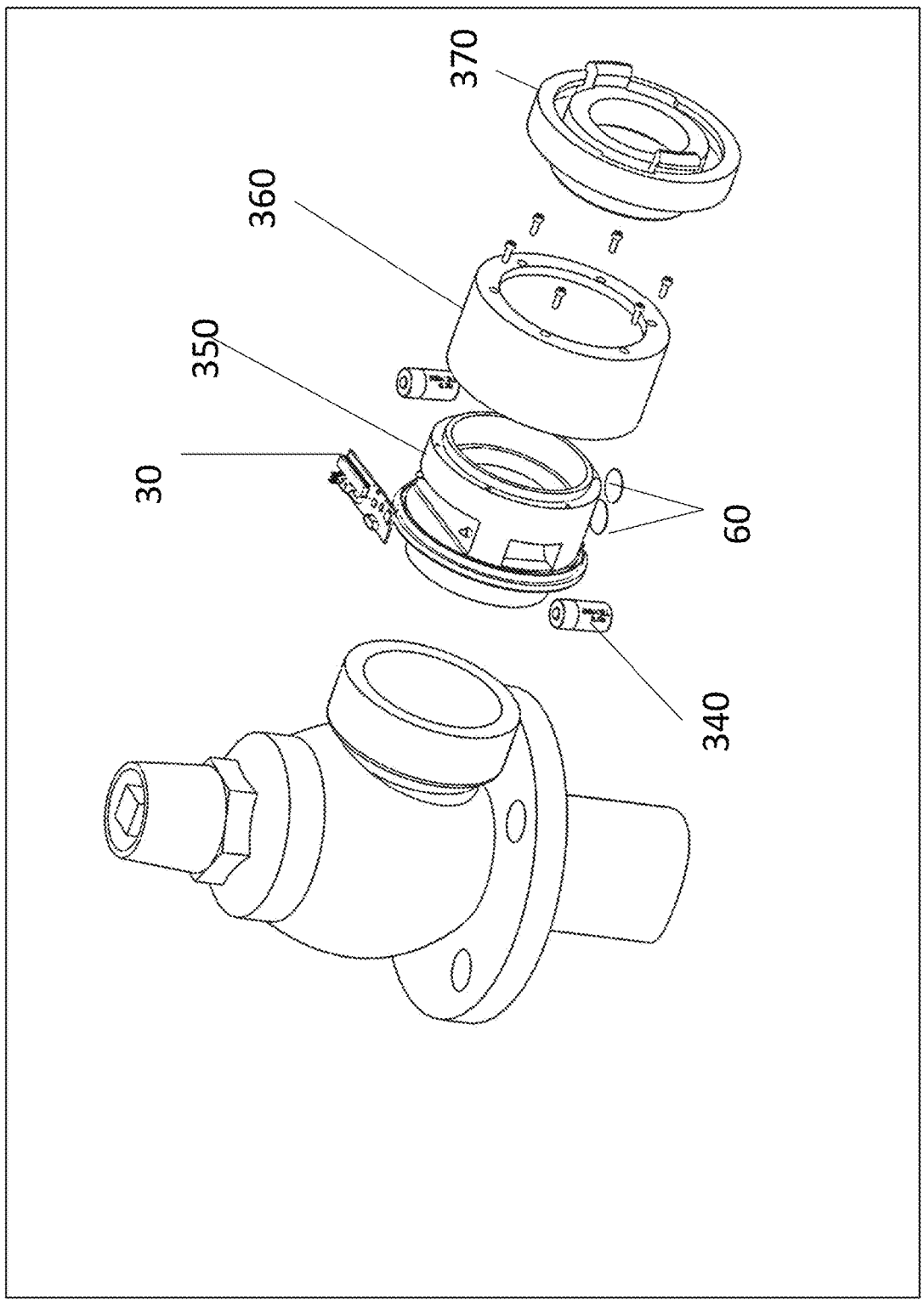
FIG. 7 is a perspective view of the identification device installed on a hydrant outlet according to some embodiments of the invention.

FIG. 7 is an exploded view of the flow identification device on a hydrant outlet according to some embodiments of the invention. In this view are shown separately, all parts of the of the identification device: including the two sensors 60, the CPU processing unit 30, battery 340 bodies 350 and cover 360. The ring shaped identification device is enclosed by the hydrant external connector 370.

Figure 8:
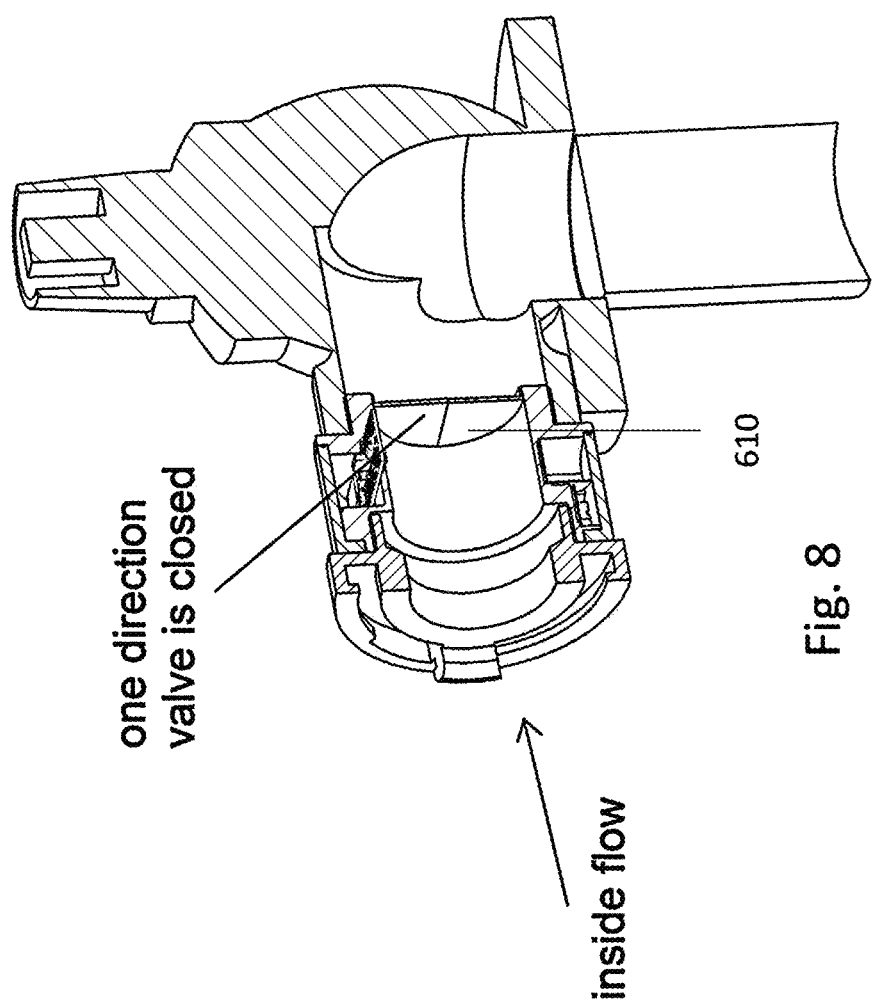
FIG. 8 is a perspective view of the flow identification device on a hydrant outlet including one direction valve in a closed position according to some embodiments of the invention.

FIG. 8 is a perspective view of the flow identification device on a hydrant outlet including one direction valve in a closed position according to some embodiments of the invention. According to this embodiment is used one directional valve which prevents any hazard liquid from entering through the hydrant into water system. The one directional valve is comprised of two flip parts 610 which are designed to rotate in only one direction, such as when a liquid flow outward from the hydrant they rotate outward, and when the liquid flow inside the hydrant the flip parts remains in closed position preventing the flow. Tis valve may be controllable.

Figure 9:
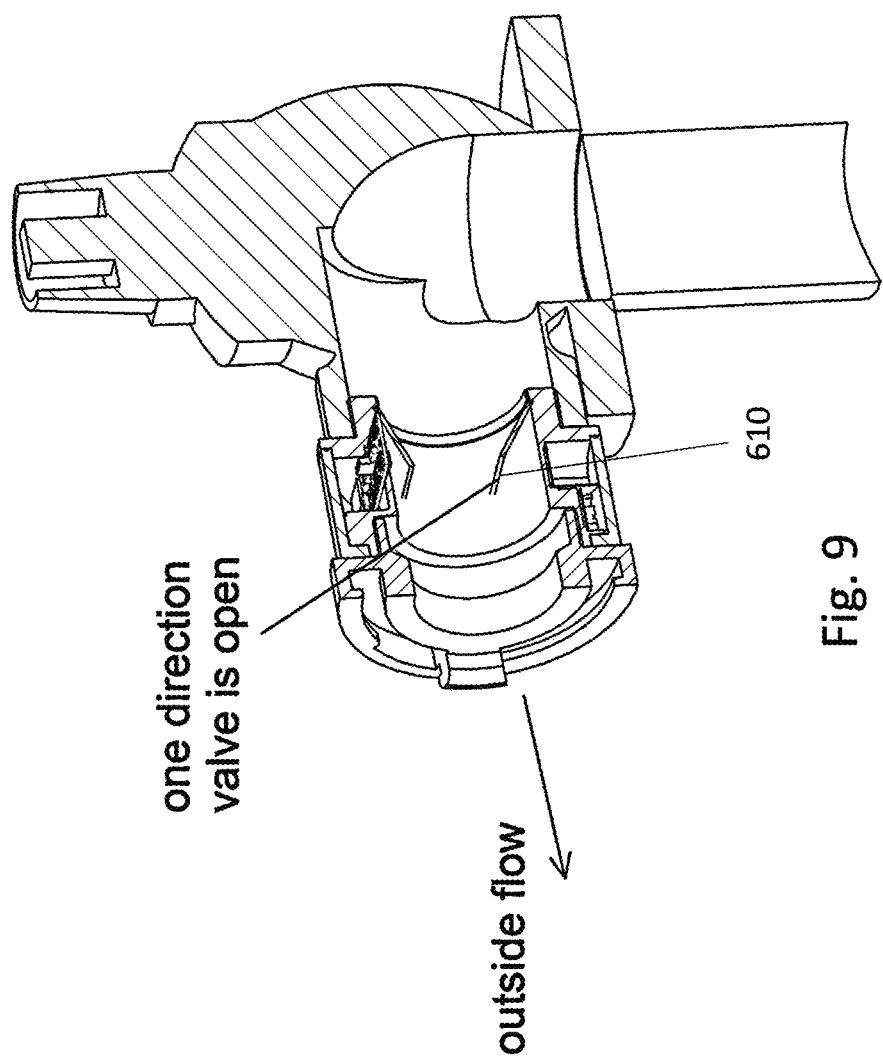
FIG. 9 is a perspective view of the flow identification device on a hydrant outlet including one direction valve in an open position according to some embodiments of the invention.
Figure 10:
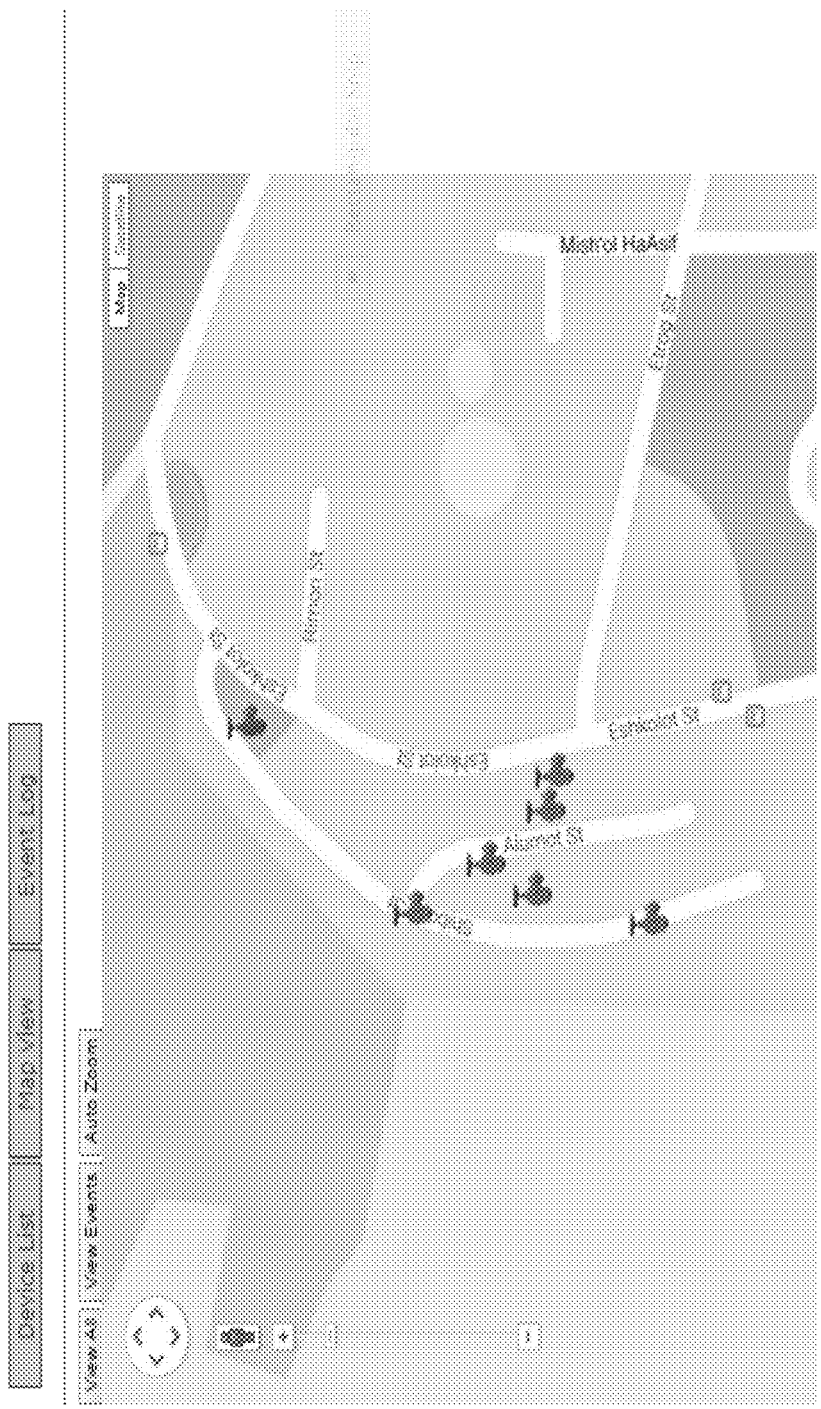
FIG. 10 is an example of hydrant management map according to some embodiments of the invention.

FIG. 9 is a perspective view of the flow identification device on a hydrant outlet including one direction valve in an open position according to some embodiments of the invention;

FIG. 10 is an example of hydrant management map according to some embodiments of the invention. The map provides information of all hydrants, providing position and status of each hydrant.

Figure 11:
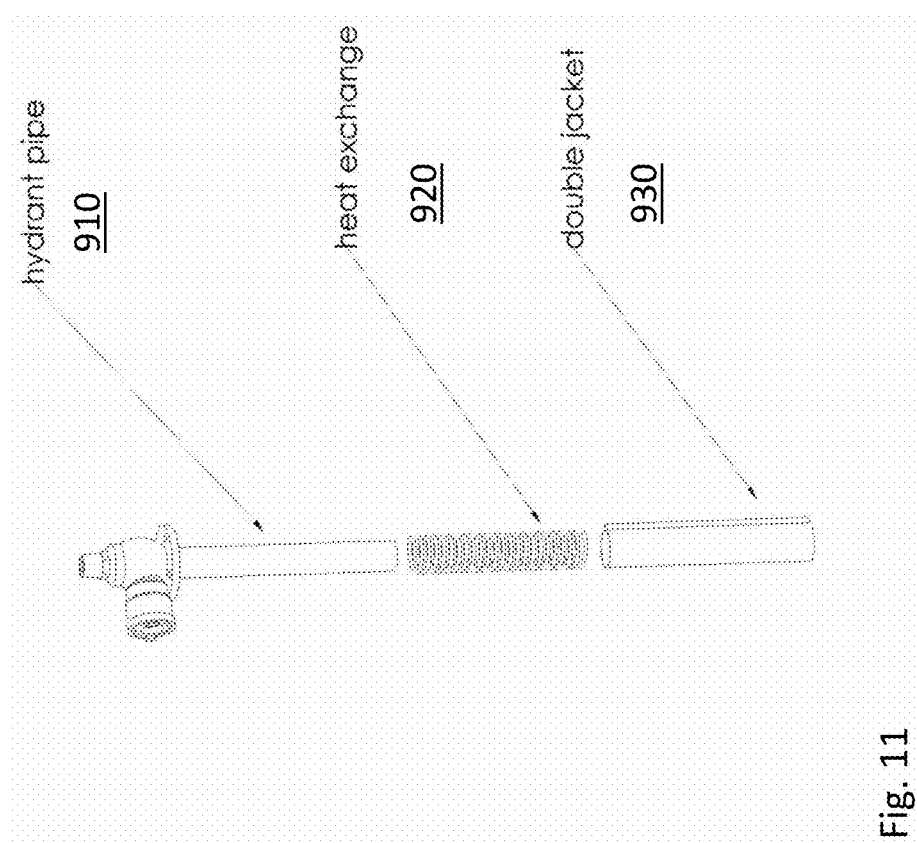
FIG. 11 is an exploded perspective view of the flow identification device on a hydrant outlet including heating module according to some embodiments of the invention.

FIG. 11 is an exploded perspective view of the flow identification device on a hydrant outlet including heating module according to some embodiments of the invention. The heat module is comprised of heat exchange 920 having spiral-spring shape enclosing the pipe of the hydrant 910, upon which is enclosed a double jacket 930.

Figure 12:
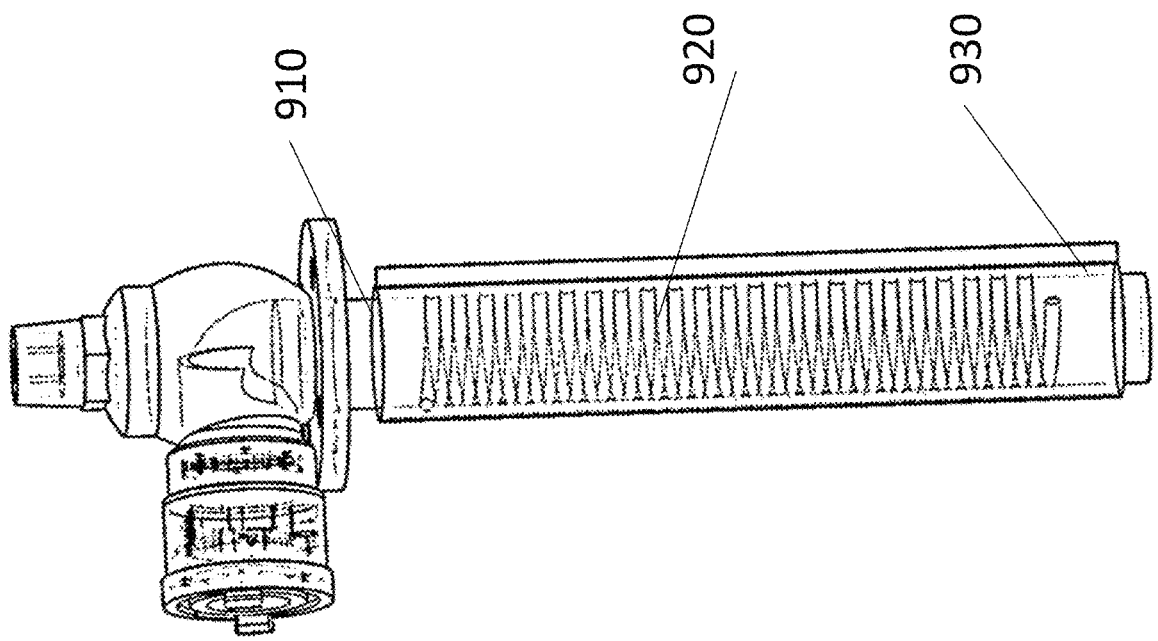
FIG. 12 is a perspective view of the flow identification device on a hydrant outlet including heating module according to some embodiments of the invention.

FIG. 12 is a perspective view of the flow identification device on a hydrant outlet including heating module according to some embodiments of the invention. In this figure the heat exchange unit 920 can be seen within the double jacket cover 930 upon the hydrant pipe 910.

According to some embodiment of the present invention, each hydrant may include earth quake sensors (seismic sensors), the alert data from these sensor is transmitted to the central system, in case the sensor measurement are beyond a predefined threshold, enabling to analyze, the results from the network of hydrant devices for identifying earth quake events.

According to some embodiment of the present invention, each hydrant may include underground flow sensors.

Figure 13:
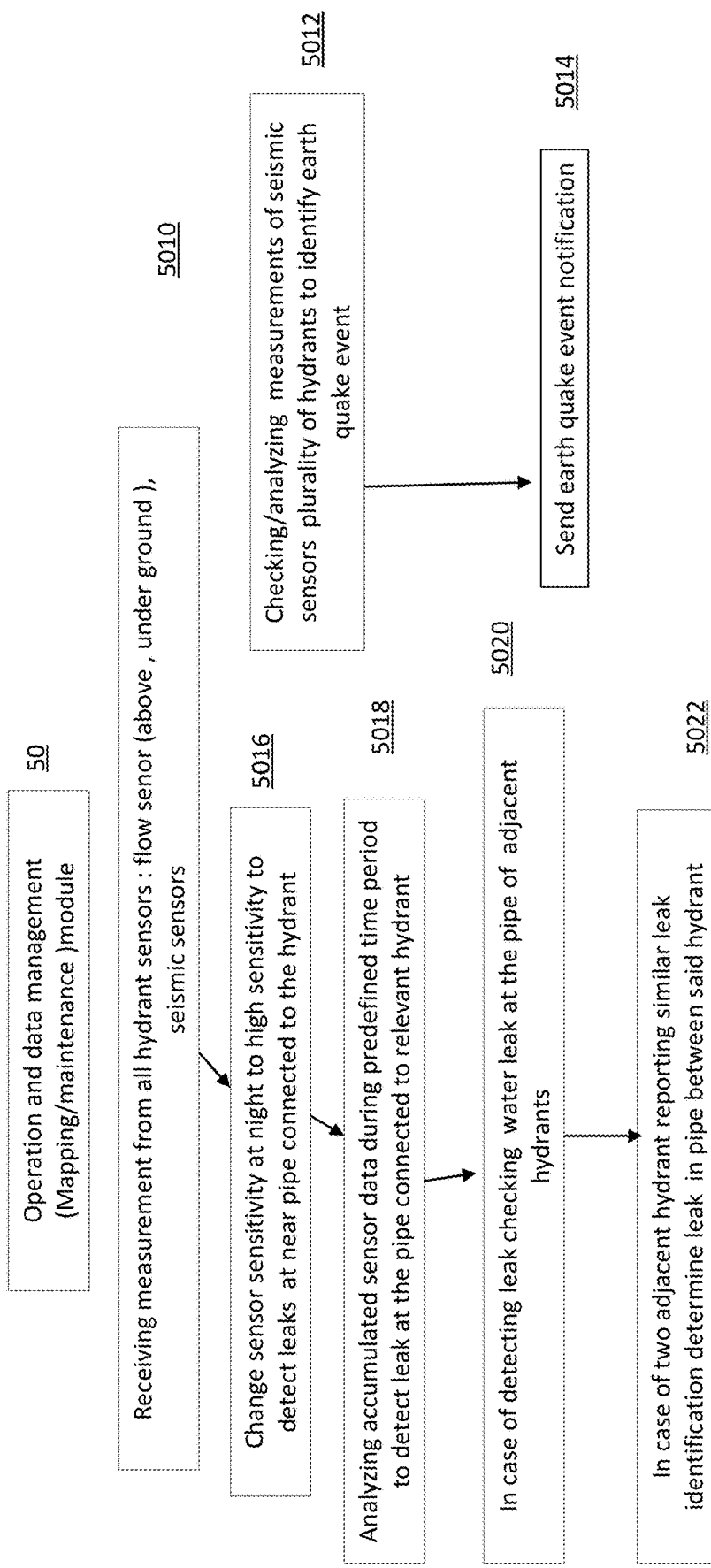
FIG. 13 is an illustration of the flow of operation and data management module according to some embodiments of the invention.
Figure 14:
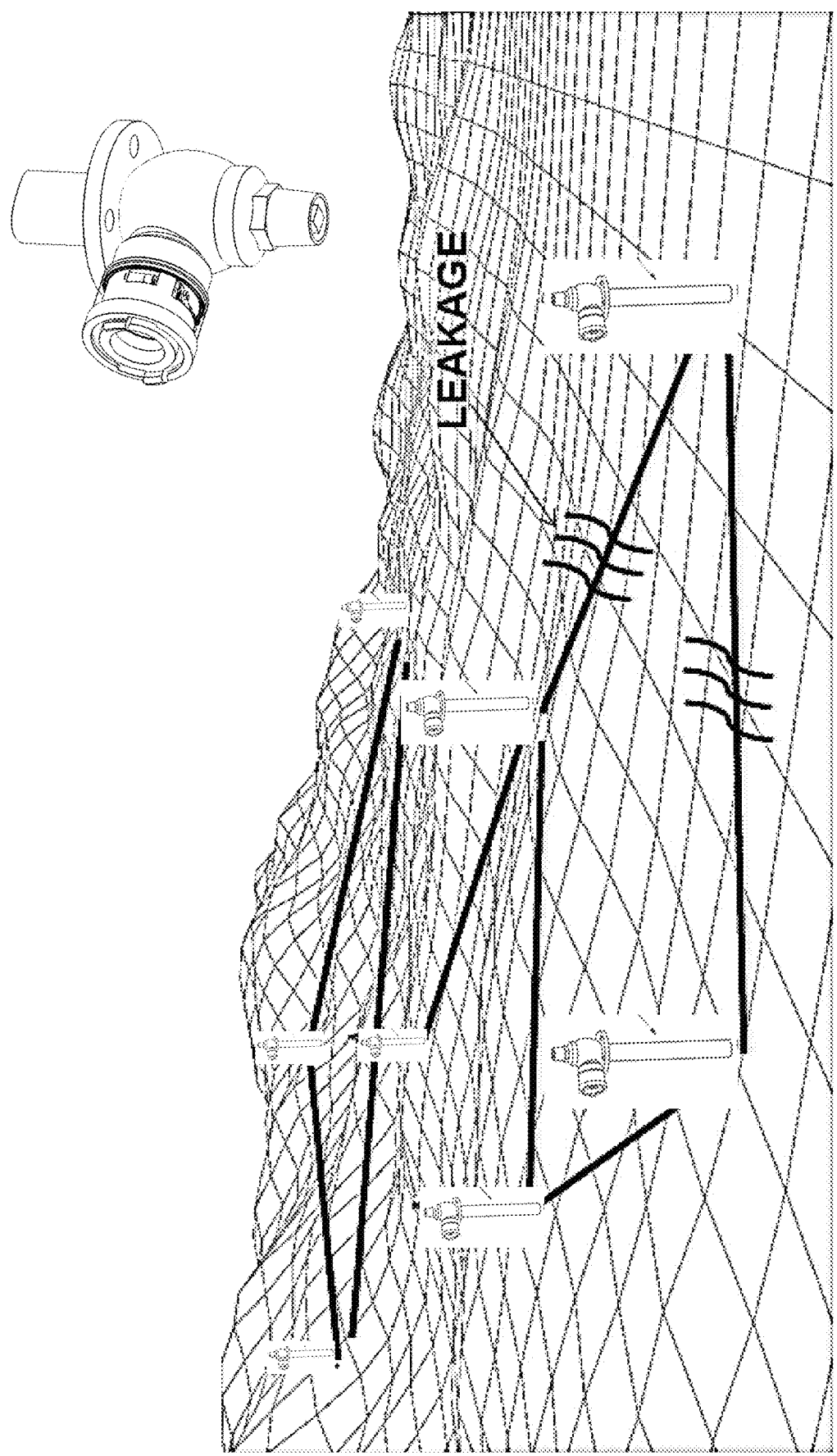
FIG. 14 is an example of hydrant network implementation for detecting leakage according to some embodiments of the invention.

FIG. 13 is an illustration of the flow of operation and data management module according to some embodiments of the invention. The module implement at least one of the following steps:

Receiving measurement from all hydrant sensors: flow senor and seismic sensors (5010);
Checking/analyzing measurements of seismic sensors plurality of hydrants to identify earth quake event (5012);
Send earth quake event notification (5014) in case measurement is above pre-defined threshold;
Change flow sensor sensitivity at night to high sensitivity to detect leaks at nearby pipes (5016);
Analyzing accumulated sensor data during predefined time period to detect leak at the pipe connected to relevant hydrant (5018);
In case of detecting leak at one hydrant sensor checking water leak at the pipe of adjacent hydrants (5020);
In case of two adjacent hydrant reporting similar leak identification determine leak in pipe between said hydrant (5022);

FIG. 14 is an example of hydrant network implementation for detecting leakage according to some embodiments of the invention. As seen in the figures hydrants with flow sensors, are scattered at pre-defined pattern, providing the management system with detailed measurements, from different locations enabling to detect leaks as described in FIG. 13.

Figure 15:
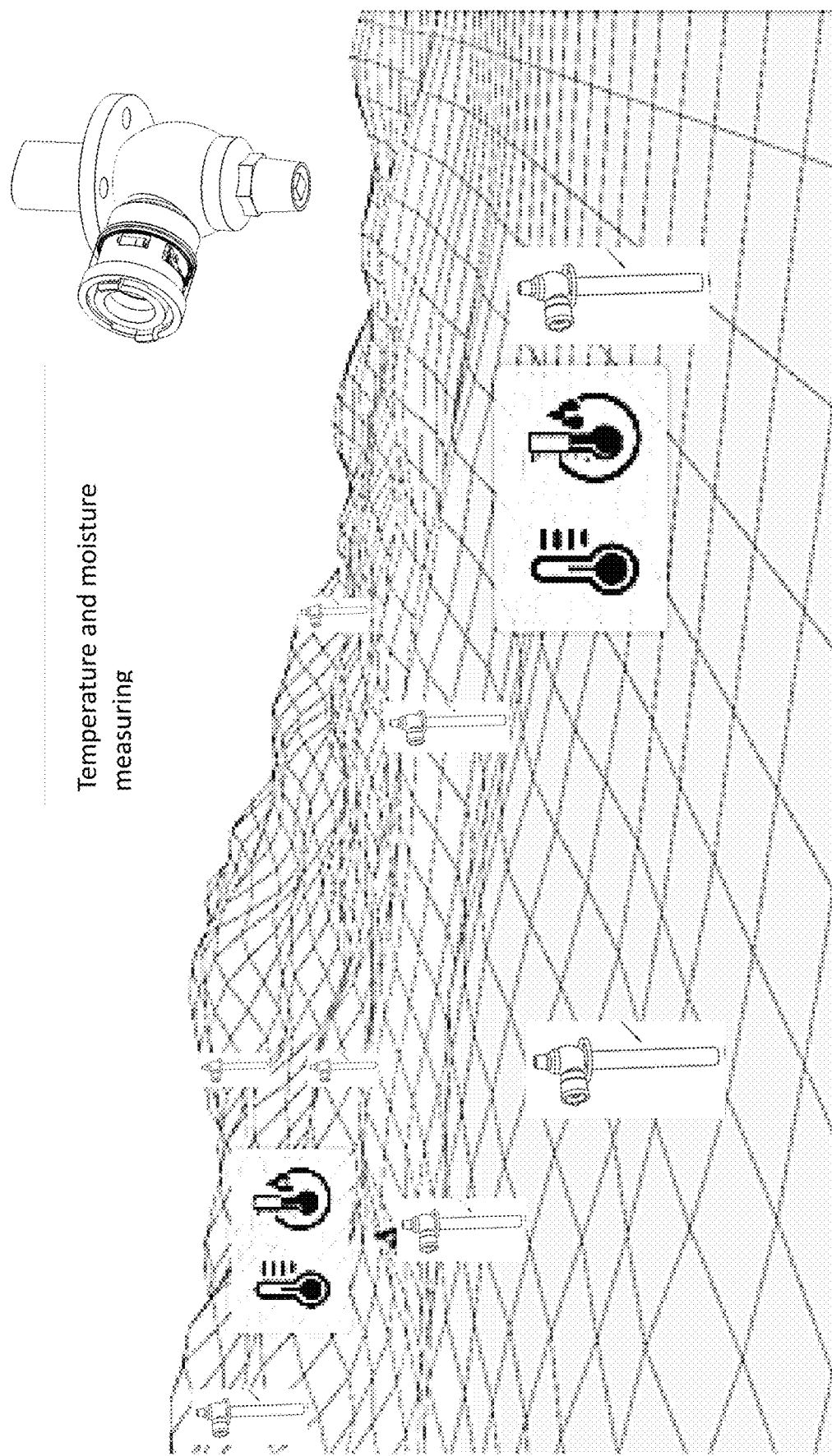
FIG. 15 is an example of hydrant network implementation for detecting weather conditions according to some embodiments of the invention.

FIG. 15 is an example of hydrant network implementation for detecting weather conditions according to some embodiments of the invention. As seen in the figure hydrants with temperature, moisture and pressure sensors, are scattered at pre-defined pattern, providing the management system with detailed measurement, from different locations enabling enhanced weather analysis.

Figure 16:
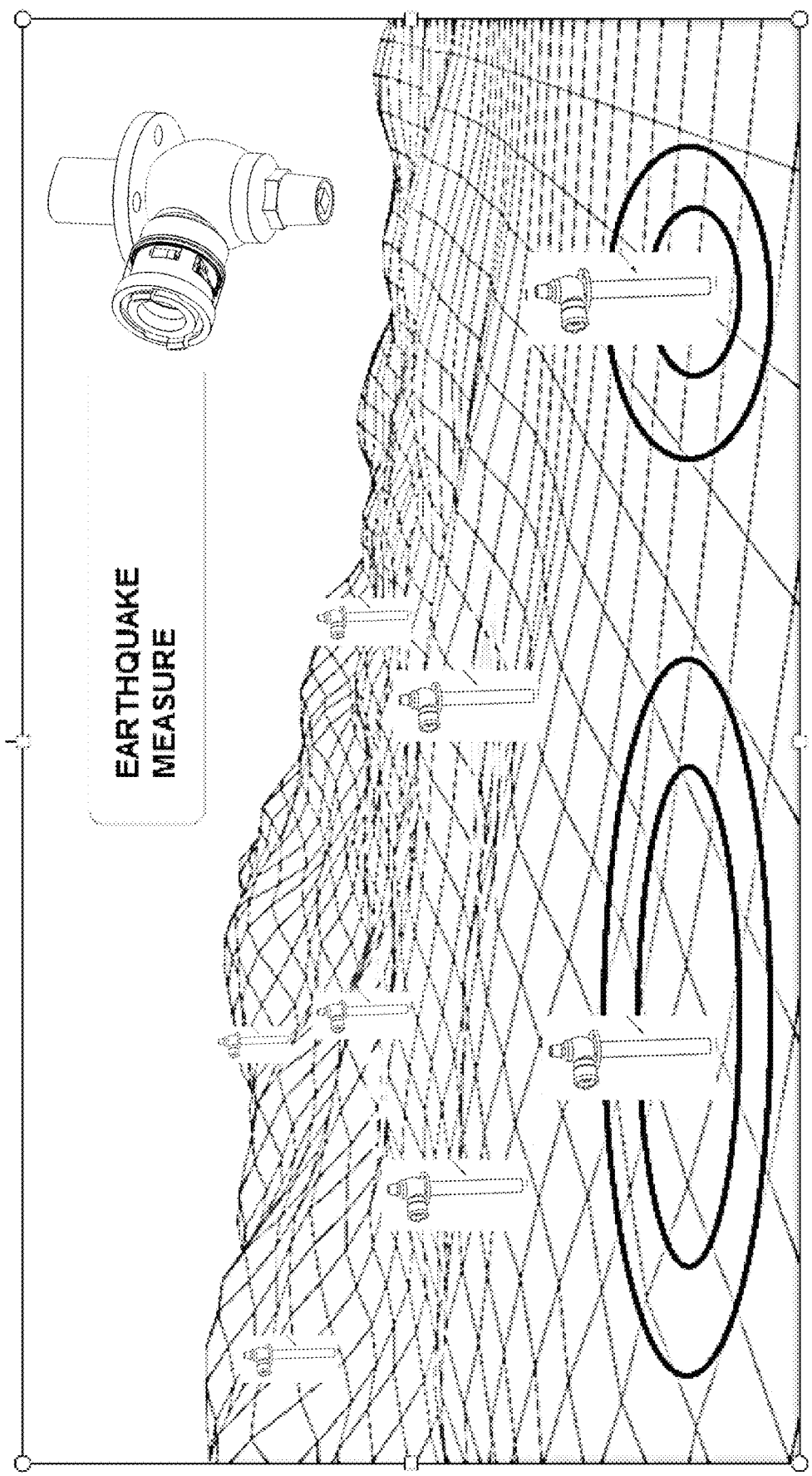
FIG. 16 is an example of hydrant network implementation for detecting earthquake according to some embodiments of the invention.

FIG. 16 is an example of hydrant network implementation for detecting earthquake according to some embodiments of the invention. As seen in the figures hydrants with seismic sensors, are scattered at pre-defined pattern, providing the management system with detailed measurement, from different locations enabling enhanced analysis of earthquake events.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

What is claimed is:

1. An apparatus for identifying irregular flow, at the entrance of a hydrant outlet, said apparatus comprised of:
   a ring-shaped housing having interface for connecting on one end the hydrant pipe end and on the other end to the hydrant outlet part;
   at least two flow detection sensors positioned in said ring-shaped housing, wherein each sensor has different level of sensitivity;
   a processor for analyzing in real-time sensors measurements, by checking differences between measurements level of the detectors, wherein based on said analysis is determined if the liquid flow is in outward direction form the hydrant or inward direction from into the hydrant and for calculating flow quantity;
   communication module for sending alerts based on the analyzed data;
   a one-direction valve installed at the hydrant, wherein the one-direction valve is comprised of two flip parts which are designed to rotate in only one direction, such that when a liquid flows outward from the hydrant they rotate outward, and when the liquid flows inside the hydrant the flip parts remain in closed position preventing the flow.

2. The apparatus of claim 1 further comprising an acoustic sensor, for activating the flow sensors upon sound measurement above predefined threshold.

3. The apparatus of claim 1 further comprising heat exchange unit installed in the hydrant pipe, wherein the heat exchange unit is comprised of spiral-spring shape enclosing the pipe of the hydrant, upon which is enclosed a double jacket cover.

4. The apparatus of claim 1 further comprising a seismic sensor, wherein the seismic measurements above pre-defined threshold are transmitted to the central system, enabling to analyze, the results from the plurality of hydrant devices for identifying earthquake events.

5. The apparatus of claim 1 further comprising a temperature sensor.

6. The apparatus of claim 1 further comprising a moisture sensor.

7. The apparatus of claim 1 further comprising sensors for measuring air pollution.

8. A monitoring system comprised of:
   a plurality of hydrants, wherein each hydrant comprises an apparatus for identifying irregular flow, at the entrance of a hydrant outlet, said apparatus comprised of:
      a ring-shaped housing having interface for connecting on one end the hydrant pipe end and on the other end to the hydrant outlet part;
      at least two flow detection sensors positioned in said ring-shaped housing, wherein each sensor has different level of sensitivity;
      a processor for analyzing in real-time sensors measurements, by checking differences between measurements level of the detectors, wherein based on said analysis is determined if the liquid flow is in outward direction form the hydrant or inward direction from into the hydrant and for calculating flow quantity;
      communication module for sending alerts based on the analyzed data;
   a central system comprised of:
      communication module for receiving sensors measurements from said plurality of hydrants;
      processing unit for analyzing said measurements for identifying alert status in case the sensor measurements analysis results indicate of irregular behavior;
   wherein the processing unit analyses flow detecting measurements of adjacent hydrant to identify leaks at pipes located in-between said adjacent hydrant;
   wherein the leaks analyses include the steps of:
      changing sensor sensitivity at night to high sensitivity to detect leaks at nearby pipe connected to the hydrant;
      analyzing accumulated sensor data during predefined time period to detect leak at the pipe connected to relevant hydrant;
      in case of detecting leak checking, water leak at the pipe of adjacent hydrants;
      in case of two adjacent hydrant reporting similar leak identification, determine leak in pipe between said hydrant.

9. The system of claim 8 wherein the processing unit analyses measurements of seismic sensors at a plurality of hydrants to identify an earthquake event.

10. The monitoring system of claim 8 further comprising at least one controllable valve for closing the hydrant wherein the server transmits an instruction to the apparatus at the hydrant for activating different modules, including at least one of: closing of the hydrant, activating different sensors, activating light, sound triggers or heating exchange unit.

11. A method for identifying irregular flow, at the entrance of hydrant outlet using at least two flow detection sensors positioned at the entrance of hydrant, a processor and remote server, said method implemented by one or more processors operatively coupled to a non-transitory computer readable storage device, on which are stored modules of instruction code that when executed cause the one or more processors to perform:
   detecting flow measurements from each sensor, wherein each sensor has different level of sensitivity;
   analyzing in real-time sensors measurements by the processor, by checking differences between measurements level of the detectors, wherein based on said analysis is determined if the liquid flow is in outward direction form the hydrant or inward direction from into the hydrant and for calculating flow quantity;
   sending alerts based on the analyzed data to the remote server.

12. The method of claim 11 further comprising the steps of: analyzing seismic measurements above pre-defined threshold from seismic sensors located at the entrance of hydrant, transmitting said measurements enabling to analyze, the results from the plurality of hydrant devices for identifying earthquake events.

13. The method of claim 11 further comprising the steps of: detecting temperature using a temperature sensor and transmitting to remote server.

14. The method of claim 11 further comprising further comprising the steps of: detecting moisture using a moisture sensor and transmitting to the remote server.

15. The method of claim 11 further comprising the steps of: detecting wake up signal using an acoustics sensor and responsively activating the flow sensors.

16. The method of claim 11 further comprising the step of: transmitting an instruction to the apparatus at the hydrant for activating different modules, including at least one of: closing of hydrant, activating different sensors, activating light or sound triggers or heating exchange unit.

17. An apparatus for identifying irregular flow, at the entrance of a hydrant outlet, said apparatus comprised of:
   a ring-shaped housing having interface for connecting on one end the hydrant pipe end and on the other end to the hydrant outlet part;
   at least two flow detection sensors positioned in said ring-shaped housing, wherein each sensor has different level of sensitivity;
   a processor for analyzing in real-time sensors measurements, by checking differences between measurements level of the detectors, wherein based on said analysis is determined if the liquid flow is in outward direction form the hydrant or in ward direction from into the hydrant and for calculating flow quantity;
   communication module for sending alerts based on the analyzed data
   a heat exchange unit installed in the hydrant pipe, wherein the heat exchange unit is comprised of spiral-spring shape enclosing the pipe of the hydrant, upon which is enclosed a double jacket cover.

18. An apparatus for identifying irregular flow, at the entrance of a hydrant outlet, said apparatus comprised of:
   a ring-shaped housing having interface for connecting on one end the hydrant pipe end and on the other end to the hydrant outlet part;
   at least two flow detection sensors positioned in said ring-shaped housing, wherein each sensor has different level of sensitivity;
   a processor for analyzing in real-time sensors measurements, by checking differences between measurements level of the detectors, wherein based on said analysis is determined if the liquid flow is in outward direction form the hydrant or in ward direction from into the hydrant and for calculating flow quantity;
   communication module for sending alerts based on the analyzed data;
   a seismic sensor, wherein the seismic measurements above pre-defined threshold are transmitted to the central system, enabling to analyze, the results from the plurality of hydrant devices for identifying earthquake events.

* * * * *